United States Patent [19]

Siol et al.

[11] Patent Number: 5,395,882

[45] Date of Patent: Mar. 7, 1995

[54] LIGHT-SCATTERING POLYSTYRENE MOLDING COMPOUNDS, AND MOLDED ARTICLES PRODUCED THEREFROM

[75] Inventors: Werner Siol, Darmstadt-Eberstadt; Heinrich Post, Voerde, both of Germany

[73] Assignee: Rohm GmbH Chemische Fabrik, Darmstadt, Germany

[21] Appl. No.: 121,870

[22] Filed: Sep. 17, 1993

[30] Foreign Application Priority Data

Sep. 24, 1992 [DE] Germany .................. 4231995.1

[51] Int. Cl.⁶ .................. C08L 33/06; C08L 25/04
[52] U.S. Cl. .................. 525/82; 525/227
[58] Field of Search .................. 525/227, 82

[56] References Cited

U.S. PATENT DOCUMENTS

| | | | |
|---|---|---|---|
| 3,992,486 | 11/1976 | Lang . | |
| 4,268,549 | 5/1981 | Fink .................. | 427/393.5 |
| 4,889,894 | 12/1989 | Siol et al. .................. | 525/227 |
| 4,892,909 | 1/1990 | Siol et al. .................. | 525/216 |
| 4,948,668 | 8/1990 | Siol et al. .................. | 428/373 |
| 4,952,455 | 8/1990 | Siol et al. .................. | 428/373 |
| 5,023,123 | 6/1991 | Siol et al. .................. | 428/392 |
| 5,109,072 | 4/1992 | Siol et al. .................. | 525/228 |

FOREIGN PATENT DOCUMENTS

| | | |
|---|---|---|
| 0188325 | 7/1986 | European Pat. Off. . |
| 0342283 | 11/1989 | European Pat. Off. . |
| 2146607 | 3/1972 | Germany . |
| 57-14650 | 1/1982 | Japan . |
| 61-159440 | 7/1986 | Japan . |
| 3068643 | 3/1991 | Japan . |

Primary Examiner—James J. Seidleck
Assistant Examiner—I. Zemel
Attorney, Agent, or Firm—Oblon, Spivak, McClelland, Maier, & Neustadt

[57] ABSTRACT

The invention relates to light-scattering polystyrene molding compounds comprising 40–99.9 weight % of a (optionally impact-strength-modified) polymeric matrix phase comprised of at least 50 weight % styrene and or substituted styrenes, or a mixture thereof; and 0.1–60 weight % of scattering bodies comprising a copolymer comprised of:

p1) 20–89.5 parts by weight (pbw) methyl methacrylate, ethyl methacrylate, or a mixture thereof;

p2) 10–80 pbw of at least one monomer of formula (I)

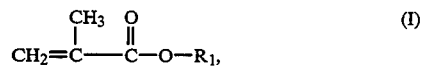

where $R_1$ represents a $C_{3\text{-}24}$ alkyl group; and p3) 0.5–10 pbw of at least one crosslinking monomer with two or more ethylenically unsaturated, radically polymerizable groups; and p4) 0–10 pbw of additional ethylenically unsaturated monomers which are radically copolymerizable with (p1), (p2), and (p3); wherein the sum of the amounts of the monomers (p1), (p2), (p3), and (p4) is 100 pbw.

18 Claims, No Drawings

LIGHT-SCATTERING POLYSTYRENE MOLDING COMPOUNDS, AND MOLDED ARTICLES PRODUCED THEREFROM

BACKGROUND OF THE INVENTION

1. Field of the Invention

The invention relates to light-scattering polystyrene molding compounds having embedded crosslinked particles comprised of methacrylate copolymers; and molded articles produced from said molding compounds.

2. Discussion of the Background

Inorganic pigments such as titanium dioxide, barium sulfate, or silicic acid are commonly used to cloud polymer materials used to produce diffusely scattering molded articles. When these pigments are employed in sufficient concentrations and with suitable mean particle size and index of refraction, satisfactory diffusion of transmitted light can be achieved; but the light transmissivity is sharply reduced. A further disadvantage of inorganic pigments is that sedimentation occurs during polymerization which results in a nonuniform distribution of pigment in the molded article rendering the physical properties of the polymer material unsatisfactory.

In view of the preceding, dimensionally stable polymer particles have replaced inorganic pigments, however there is a substantial difference between the index of refraction of said particles and that of the polymer matrix.

U.S. Pat. No. 4,464,513 describes a clouded polyvinyl chloride (PVC) molding compound which contains crosslinked polymer particles with particle sizes between 35 and 500 micron, in amounts of up to approximately 30 weight %. The polymer particles are comprised of vinylaromatic, alkyl acrylate, alkyl methacrylate, or possibly other units of monoethylenically unsaturated monomers, and units of a crosslinking monomer which has at least two double bonds. The scattering particles are also disclosed as being useful for other thermoplastic molding compounds.

U.S. Pat. No. 4,594,363 (European Patent 188,325) describes scattering particles with a two-phase core-and-shell structure, wherein the core and shell comprise monomers having acid groups. These dispersed scattering particles are swelled with volatile bases which evaporate upon drying and leave hollow spaces in the scattering particles. The scattering particles are preferably used as replacements for inorganic pigments in dispersion dyes and in thermally hardening lacquer systems.

European Patent 342,283 describes spherically-shaped, 2-15 micron scattering particles with multiphase structure, wherein the scattering particles may be present in proportions of up to 40 weight % in a thermoplastic polymeric matrix phase. The indices of refraction of the scattering particles and the matrix phase differ by at least 0.003, and at most 0.2. Preferably, the scattering particles are composed of units of acrylates and methacrylates, and the matrix phase is composed of polymers with a higher index of refraction, such as PVC or polystyrene.

Japanese Patent Application 61-159,440 describes 30-300 micron scattering particles dispersed in polymethyl methacrylate (PMMA) in proportions up to 30 weight %. The scattering particles are composed of a copolymer of vinylaromatic, alkyl acrylate, and alkyl methacrylate units, and units of crosslinking comonomers.

German Patent 35 28 165 (U.S. Pat. No. 4,876,311) describes clouded plastic elements containing 20-50 micron beads of crosslinked polymers in proportions of 3-30 weight % (based on the weight of the polymer matrix). The polymer beads serve as scattering particles and are composed of aromatic-containing or halogen-containing monomers, vinyl monomers copolymerizable with said aromatic-containing or halogen-containing monomers, crosslinking monomers, and (optionally) strongly polar monomers. The polymer matrix, typically acrylic resins, must have an index of refraction differing from that of the scattering particles by at least 0.02.

Scattering particles for methacrylic resins comprised of copolymers of methyl methacrylate, butyl (meth)acrylate, and a crosslinking agent (e.g. allyl methacrylate), are described in Japanese Patent Application 82-14,650.

German Patent 2,146,607 (U.S. Pat. Nos. 3,992,486 and 4,000,216) claims polymer mixtures which are translucent to opaque and are composed of a continuous phase composed of a soluble uncrosslinked polymer produced by polymerization of (meth)acrylic acid esters, styrenes, vinyl chloride, or vinyl acetate, in which there are dispersed crosslinked polymer particles composed of 87-99.99 weight % of at least one monoethylenically unsaturated monomer from the group of the (meth)acrylic acid esters or the styrenes, and 0.01-3 weight % of at least one multiply unsaturated monomer, and (optionally) 0-10 weight % of a polar monomer. The scattering particles are practically spherical in shape and have particle sizes of 0.5-30 micron.

None of the aforementioned light-scattering polymer materials are entirely satisfactory in the processing of molding compounds. Often agglomeration of the scattering particles occurs during thermoplastic processing, particularly during extrusion, of molding compounds containing scattering bodies. Consequently local inhomogeneities develop in the light-scattering molded articles produced from these molding compounds.

SUMMARY OF THE INVENTION

Accordingly, one object of the present invention is to provide a light-scattering polystyrene molding compound suitable for producing molded compounds which does not agglomerate during thermoplastic processing.

The present inventors have now found that this object can be achieved with a light-scattering molded compound comprising scattering bodies comprised of a copolymer comprising:

p1) 20-89.5 weight % methyl methacrylate, ethyl methacrylate or a combination thereof;

p2) 10-80 weight % of at least one monomer of formula (I):

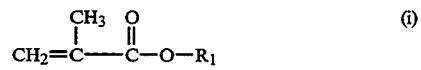

where $R_1$ represents a $C_{3-24}$ alkyl group; and p3) 0.5-10 weight % of at least one crosslinking monomer with two or more ethylenically unsaturated, radically polymerizable groups; and (optionally)

p4) 0-10 weight % of additional ethylenically unsaturated monomers which are radically copolymerizable with (p1), (p2), and (p3) wherein the sum of the proportions of the monomers (p1), (p2), (p3), and (p4) is 100 weight %, in a matrix phase comprised of at least 50 weight % styrene and/or substituted styrenes. The matrix phase can contain impact resistant phase components with glass temperature $Tg<10°$ C., is outstandingly homogeneously dispersible when mixed into a melt, and remains homogeneously dispersed during further thermoplastic processing. The mean particle size of the scattering bodies is 0.5–150 micron, and the proportion of the scattering bodies is 0.1–60 parts by weight (pbw) (based on the weight of the light scattering polystyrene molding compound).

Further, the present inventors have also achieved this object with a light-scattering molded compound comprising a polymeric flowability agent which is mixed with the scattering bodies in proportions of 5–95 pbw (based on the weight of the bodies) prior to introduction into the matrix phase, wherein the polymeric flowability agent comprises f1) 20–90 weight % methyl methacrylate, ethyl methacrylate or a combination thereof;

f2) 10–80 weight % of at least one monomer of formula (I); and (optionally)

f3) 0–10 weight % of additional ethylenically unsaturated monomers which are radically copolymerizable with (f1) and (f2); wherein the sum of the proportions of the monomers (f1), (f2), and (f3) is 100 weight %.

DETAILED DESCRIPTION OF THE PREFERRED EMBODIMENTS

Suitable scattering bodies useful in accordance with the present invention are comprised of a copolymer comprising monomer units (p1), (p2), (p3), and (optionally) (p4). The sum of the proportions of the monomers is 100 weight %.

The scattering bodies comprised of copolymer suitably consist of latex particles with a mean particle size 0.5–150 micron, preferably 1–10 micron, particularly preferably 1–5 micron. Suitable scattering bodies can be manufactured as described in U.S. Pat. No. 4,268,549, incorporated herein by reference. Preferably, the scattering bodies comprised of copolymer are spherically shaped. They are preferably produced according to the so-called seed latex process, for example, by spray drying to a powder under conditions in which the individual particles do not melt.

The index of refraction of the copolymer of which the scattering bodies are comprised must differ from the index of refraction of the matrix polymer by at least 0.02 in order to achieve the necessary scattering effect.

Suitable monomers (p2) of the formula (I) include methacrylic acid esters wherein $R_1$ is n-propyl, n-butyl, isobutyl, tert-butyl, n-pentyl, amyl, n-hexyl, n-heptyl, n-octyl, 2-ethylhexyl, n-decyl, n-dodecyl, n-tetradecyl, n-hexadecyl, or n-eicosyl, or the alkyl group of a tallow fatty alcohol. Alternatively, $R_1$ can also represent a substituted or unsubstituted cycloalkyl group such as cyclopentyl, cyclohexyl, 3,3,5-trimethylcyclohexyl, or cyclooctyl. Suitable substituents include methyl, ethyl or butyl.

Suitable crosslinking monomers (p3) include:
(meth)acrylate esters of diols, such as ethylene glycol di(meth)acrylate or 1,4-butanediol di(meth)acrylate;
aromatic compounds with two vinyl or allyl groups, such as divinylbenzene or diallyl phthalate; or other crosslinking agents having two ethylenically unsaturated, radically polymerizable groups, such as allyl methacrylate, graft crosslinking agents, 2,2-dihydroxymethyl-1-butanol di(meth)acrylate, hydroquinone di(meth)acrylate, bisphenol-A di(meth)acrylate, or N-methyl-di(meth)acrylamide.

Suitable crosslinking agents (p3) having three or more unsaturated, radically polymerizable groups include triallyl cyanurate, 2,2-dihydroxymethyl-1-butanol tri(meth)acrylate, and pentaerythritol tetra(meth)acrylate. Additional suitable crosslinking agents (p3) which are useful in accordance with the present invention are described in U.S. Pat. No. 4,513,118, incorporated herein by reference.

The comonomers (p4), which can optionally be present in the copolymer in amounts of 0–10 weight %, include monomers of the formula (II):

where $R_2$ represents hydrogen or methyl; and Q represents $COOR_3$, wherein $R_3$ represents hydrogen or a monovalent cation, preferably an alkali or ammonium cation, or preferably $R_3$ represents an alkyl group optionally substituted with an alkoxy group, a hydroxyl group, or an aminoalkyl group, preferably a $C_{1-3}$-alkyl group. When $R_2$ is hydrogen, preferably $R_3$ is a $C_{1-24}$-alkyl group.

Suitable comonomers (p4) include (meth)acrylic acid, salts of (meth)acrylic acid (such as sodium- or ammonium methacrylate), hydroxyalkyl esters of (meth)acrylic acid (such as 2-hydroxyethyl (meth)acrylate or 2-hydroxypropyl (meth)acrylate), alkoxyalkyl esters of (meth)acrylic acid (such as 2-butoxyethyl (meth)acrylate or 2-methoxyethyl (meth)acrylate), or aminoalkyl esters of (meth)acrylic acid (such as 2-dimethylaminoethyl (meth)acrylate, 2,2,6,6-tetramethyl-4-piperidyl (meth)acrylate, or 3-dimethylaminopropyl (meth)acrylate).

Preferred comonomers (p4) are $C_{1-24}$-esters of acrylic acid (such as methyl acrylate, ethyl acrylate, butyl acrylate, 2-ethylhexyl acrylate), styrene or $C_{1-3}$-alkyl substituted derivatives of styrene (such as α-methylstyrene, m-methylstyrene, and p-methylstyrene).

Particularly preferably, the copolymer comprises monomer units as follows: 90–99.5 weight % of a mixture of methyl methacrylate (monomer p1) and a lower alkyl methacrylate (monomer p2), such as isobutyl- or n-butyl methacrylate, in a weight ratio in the range of from 3:1 to 1:3 (p1:p2); along with 0.5–10 weight % of a crosslinking monomer (p3).

Suitable polymeric flowability agents in accordance with the present invention are formed from the monomers (f1), (f2), and optionally (f3) by conventional methods, such as radical or group transfer polymerization (see Rauch-Puntigam et al., 1967, "Acryl- und Methacrylverbindungen", Springer-Verlag: Heidelberg; Houben-Weyl, 1961, 4th Ed., Vol. XIV/1, Thieme-Verlag, pp. 1010, incorporated herein by reference). The polymerization of the polymeric flowability agent can be carried out in bulk, in suspension, in emulsion, or in solution. In the case of radical polymerization, preferably initiators include peroxide compounds, particularly organic peroxides such as dibenzoyl peroxide or lauroyl peroxide, azo compounds such as azodiisobutyronitrile, or redox initiators. The initiators are suitably used in amounts of 0.01–5 weight % (based on the amount of the monomers). Alternatively, the radical polymerization can be initiated by high energy radiation. Suitable polymerization regulators include sulfur compounds such as mercapto compounds, in amounts of 0.1–5 weight % (based on the amount of monomers).

The polymeric flowability agent suitably has a mean molecular weight (determined, for example, by gel permeation chromatography) of from 2,000–1,000,000 Dalton, preferably 10,000–200,000 Dalton. (For determination of molecular weights, see Mark et al., 1987, "Encyclopedia of Polymer Science and Engineering", 2nd Ed., Vol. 10 J. Wiley, pp. 1-19.) The nonuniformity $U = Mw/Mn - 1$, of the polymeric flowability agent, is generally in the range 0.1–2. Mw stands for weight average molecular weight, Mn for number average molecular weight, both determined by gel permeation chromatography.

Preferably, the polymeric flowability agents contain 20–90 weight % of monomer units (f1) and 10–80 weight % of monomer units (f2) of formula I, where $R_1$ represents a $C_{3-24}$ alkyl group, preferably a $C_{4-18}$ alkyl group. Further, the relative proportion of monomer(s) (f2) in the following flowability agent suitably decreases as the number of carbon atoms in $R_1$ increases. That is, the relative proportion of monomer (f2) varies in the opposite sense to the number of carbon atoms in $R_1$.

According to the invention, suitable polymeric flowability agents comprise 50 weight % methyl methacrylate and 50 weight % butyl methacrylate or 70 weight % methyl methacrylate and 30 weight % n-decyl methacrylate.

Available studies suggest that the number of carbon atoms in the substituent $R_1$ of monomer component (f2) should exceed the number of carbon atoms in the methyl and/or ethyl substituents of monomer component (f1) by $\geq 2$, preferably $\geq 3$. In the temperature range of from 150°–250° C., such flowability agents have high flowabilities which are similar to those of the styrene-containing matrix polymers. The melt flow index of most flowability agents is generally in the range of 2–40 g/10 min, preferably 5–10 g/10 min in the temperature range of from 180°–250° C. The flowability agents suitably form compatible polymeric mixtures with the matrix polymers. Compatible polymeric mixtures can be characterized according to recognized criteria (see Kirk-Othmer, 1982, "Encyclopedia of Chemical Technology", 3rd Ed., Vol. 18, pub. J. Wiley, pp. 457–460; Brandrup et al., 1975, "Polymer Handbook", 2nd Ed Vol III, Wiley Interscience, p. 211). In compatible polymer mixtures, a single index of refraction and a single glass transition temperature which is between the glass transition temperatures of the two polymer components, the flowability agent and the matrix polymer is observed. As a further indication of compatibility, an LCST (lower critical solution temperature) occurs. The existence of an LCST depends on the phenomenon wherein when a clear, transparent mixture is heated, it separates into different phases and becomes optically cloudy, which is unambiguous evidence that the original polymer mixture comprised a single phase in thermodynamic equilibrium (see, Paul, D. R., 1985, "Polymer Blends and Mixtures", Martinus Nijhoff: Dordrecht and Boston, pp. 1–3).

In another embodiment, flowability agents based on polystyrene are employed. In this case one starts with relatively flowable polystyrene molding compounds. The melt flow index of these polystyrene molding compounds is generally in the range 2–20 g/10 min, preferably 4–10 g/10 min at 200° C. (for 5 hours).

Suitable matrix polymers useful in accordance with the present invention are comprised of at least 50 weight %, preferably at least 75 weight %, particularly preferably at least 90 weight %, of monomer units of styrene, substituted styrenes or a combination thereof. Suitable substituents are i.e., methyl or ethyl.

Suitably, the matrix polymer is produced from the aforesaid monomers by conventional polymerization methods (see Vieweg, R., and Aumiller, G., 1959, "Kunststoff-Handbuch", Vol. V ("Polystyrol"), Curt Hanser; 1980, "Ullmanns Enzyklopaedie der technischen Chemie", 4th , Ed., Vol. 19, Verlag Chemie, p. 265; and Houben-Weyl, supra, pp. 753, all incorporated herein by reference). Styrene and substituted styrenes can be polymerized cationically, anionically, radically, or coordinatively. Preferably, they are polymerized radically. The polymerization can be initiated thermally or preferably by addition of radical initiators. Suitable radical initiators include those described above for production of the polymeric flowability agent. The polymerization rate over the entire temperature range can be adjusted by selection of an appropriate polymerization initiator. The weight average molecular weights (for determination of molecular weight, see supra) of the matrix polymers are 10,000–1,000,000 Dalton, preferably 50,000–500,000 Dalton, particularly preferably 100,000–350,000 Dalton.

Optionally the polymeric matrix phase can contain polymeric impact modifiers in proportions of up to 30 weight %, wherein the particles comprising the impact resistant phase have particle sizes of 0.01–20 micron and are finely dispersed in the matrix phase. Suitable polymers forming the impact modifiers have glass temperatures $<10°$ C., preferably $<-10°$ C., and ordinarily are classified as "elastomers" or "rubbers". Suitable polymers useful in impact modifiers include polysiloxanes, ethylene-vinyl acetate copolymers, polyacrylates or preferably polyolefins. These polymers can be cross-linked. Particularly preferably polydienes are used. Matrix-phase polymers can be produced using conventional methods, for example, by polymerization in bulk, in suspension, or in emulsion (see Kirk-othmer, 1982, 1983, supra, Vol. 17, pp. 470–471, and Vol. 21, pp. 811–816).

The pulverulent scattering bodies comprised of copolymer are premixed with the matrix polymer and with the flowability agent(s) (if any), which can be in any form suitable for mixing such as powder or granulate; the premixing is accomplished with the use of slow-speed mixing apparatus, such as drum mixers, open-wheel mixers, or double chamber plowshare-type mixers. The slow-speed mixing apparatus produces mechanical mixing without, as a rule, eliminating the phase boundaries (see "Ullmanns Enzyklopaedie der technischen Chemie", supra, Vol. 2, pp. 282-311).

Generally, so-called "master batches" are first produced. Master batches are mixtures of scattering bodies and matrix phase, or mixtures of scattering bodies and flowability agents, wherein the mixing ratio of scattering bodies to matrix phase or scattering bodies to flowability agent is in the range of from 3:1 to 1:5. The master batches are subsequently processed thermoplastically by homogeneous mixing of the above-mentioned mixing components in the melt, with the use of heatable mixing apparatus at temperatures of from 150°–300° C., in kneaders or preferably extruders such as single- or multi-screw extruders, or optionally in extruders with oscillating screws and shear pins (for example Bussco kneaders). With this method, uniformly sized granulates with granule sizes of from 2-5 mm can be produced. The granulates are comprised of a thermoplastic component, comprised of matrix phase or flowability agent, containing dimensionally stable scattering bodies embedded therein. In certain cases, the thermoplastic component can comprise mixtures of the matrix polymer and flowability agent(s) in a mixing ratio of from 10:1-1:10.

In a second processing step the "master batch" granulates are mixed with the granulate of the matrix phase, as described above, mechanically and thermoplastically, in mixing ratios of master batch to matrix phase in the range of from 1:3-1:100, preferably 1:5-1:50. The resulting light-scattering molding compounds are granulated following the thermoplastic processing step. They are available in that form for further processing, for example, to produce molded articles or plates, by injection molding or extrusion.

The light-scattering molding compounds of the present invention, comprised of matrix phase, scattering bodies, and optionally flowability agents, can be further comprised of light protection agents (such as UV-absorbers), stabilizers (such as radical scavengers), lubricants, and separation agents. (Suitable compounds can be selected as described in Gaechter, R., 1989, "Taschenbuch der Kunststoffadditive" 3rd Ed Hanser Verlag )

Particularly important is the use of UV-absorbers. UV-absorbers are suitably contained in the light-scattering molding compounds in proportions of 0.01-2 weight %. Particularly preferred is the incorporation of benzotriazole type UV-absorbers in the master batch itself in elevated concentration suitably 0.1-10 weight %, preferably 0.5-5 weight %. In a particularly preferred embodiment the master batch contains 1-20 weight % of UV-absorbers (based on the proportion of scattering bodies contained in the master batch), such as TINU-VIN®P (supplied by Ciba Geigy). Depending on the amount of scattering bodies used, light-scattering molding compounds can be produced which range from translucent to opaque.

To produce the master batches, the pulverulent scattering bodies can be incorporated into the polymeric matrix phase free of dust. Because of the excellent flowability properties of the polymeric flowability agents, the proportion of the scattering bodies in master batches comprised of scattering bodies and flowability agent(s) can be very high. The fine-particled scattering bodies can be distributed with surprisingly good uniformity in the polymeric matrix. Neither local agglomerations (so-called "cloud formation") nor sedimentation (such as occurs with high density inorganic fillers) occurs. The overall transmissivity is much better than that of molding compounds according to the state of the art, and this is achieved with good scattering action (for example, images of light sources are no longer formed on the surfaces of molded articles produced with the inventive light-scattering molding compounds). The transmissivity is generally better than 45%.

The scattering bodies of the present invention retain their shape under the temperature and shear conditions of extrusion, and the sharp transition in index of refraction between the matrix phase and scattering bodies is maintained. This is surprising because the compatibility between the matrix polymer and the uncrosslinked copolymer of the scattering bodies (which compatibility is responsible for the homogeneous distribution of the scattering bodies) would lead one to expect a gradual and continuous transition of the index of refraction at the phase boundary between the scattering bodies and the matrix polymer.

Articles molded from the inventive light-scattering molding compounds, such as lamps or projection screens, have excellent light scattering characteristics along with high transmissivity. This enables maximum illumination of rooms or projection systems, with reduced lighting power and therefore reduced heat evolution.

In general, the light-scattering polystyrene molding compounds of the present invention contain scattering bodies (comprised of copolymers CP) in the amount of, preferably, 0.2-5.0 weight %. In general, a master batch is first produced which has an elevated proportion of scattering body material, such as 5-60 weight %, preferably 10-50 weight %, particularly preferably 20-40 weight %; and this master batch is then diluted with matrix polymers to attain the required content of scattering bodies in the light-scattering molding compound. In a particularly preferred embodiment, UV-absorbers are mixed into the master batch in proportions of generally 1-10 weight %.

Having generally described this invention, a further understanding can be obtained by reference to certain specific examples which are provided herein for purposes of illustration only and are not intended to be limiting unless otherwise specified.

EXAMPLES

Example 1

Production of the scattering bodies:

Into a polymerization vessel with a stirrer, external cooling, and a feed vessel, 1,200 pbw completely desalinated water was charged and was heated to 80° C. Then 6 pbw ammonium peroxydisulfate and 5 pbw of a mixture comprised of 47.5 weight % methyl methacrylate, 47.5 weight % isobutyl methacrylate, and 5 weight % ethylene glycol dimethacrylate were added. After 5 min, 295 pbw of mixture was added dropwise over a period of 1 hr. After the end of the addition, the mixture was stirred for an additional hour at 80° C., then was cooled and was filtered through an aspiration filter. The resulting dispersion was coagulate-free and had solids content 20%. The mean particle diameter was 0.65 micron.

In a second stage, 280 pbw completely desalinated water and 5.5 pbw of the above-described Dispersion were charged to a polymerization vessel and heated to 80° C. Then 0.18 pbw ammonium peroxydisulfate and an emulsion comprised of 215 pbw methyl methacrylate, 215 pbw isobutyl methacrylate, 23 pbw ethylene glycol dimethacrylate, 800 pbw completely desalinated water, 0.68 pbw sodium lauryl sulfate, and 1.6 pbw ammonium peroxydisulfate were added dropwise over a period of 4 hrs. After completion of the addition, further polymerization was carried out for 1 hr at 80° C., then an additional 0.45 pbw ammonium peroxydisulfate was added, followed by final polymerization 1 hr at 80° C. The resulting dispersion was free of coagulates and had solids content of 30%. The mean particle diameter of the latex particles, which could loosely aggregate to form larger particles, was approximately 2.5 micron. The index of refraction of the copolymer was calculated as $n_D° = 1.485$, from the increments D of the polymer components, in accordance with Brandrup, J., and Immergut, E. H., supra, Vol. VI, p. 451.

Example 2

Production of the polymeric flowability agents:

5000 g methyl methacrylate and 5000 g butyl methacrylate were mixed together, 100 g dodecyl mercaptan as a regulator and 15 g t-butyl peroxyneodecanoate and 5 g t-butyl peroxy-2-ethylhexanoate as initiators were added, and the mixture was charged to a bag comprised of HOSTAPHAN (R) (trademark of Hoechst AG), followed by polymerization for 24 hr at 45° C. and then 10 hr at 80° C.

The result was a highly transparent block of plastic, which was comminuted and was degassed and granulated in an extruder.

The resulting plastic granulate had J = 25 ml/g.

Example 3

Production of a master batch MB1 comprised of scattering bodies and matrix phase:

50 pbw of the spray-dried emulsion polymerization product according to Example 1 (SK) and 50 pbw polystyrene (VESTYRON ® 114, supplied by Huels) (MP) were mixed in a melting kneader at 200° C. at 30 rpm. The result was a homogeneous melt (torque 5 Nm). The master batch MB1 thus produced was ground to a fine powder prior to further processing.

Example 4

Production of a master batch MB2 comprised of scattering bodies and flowability agent:

50 pbw of the spray-dried emulsion polymerization product according to Example 1 (SK) and 50 pbw of a copolymer comprised of 50 weight % methyl methacrylate and 50 weight % n-butyl methacrylate (material according to Example 2) were mixed in a melting kneader at 200° C. at 30 rpm. The result was a homogeneous and readily flowable melt (torque 1.0 Nm). The master batch MB2 thus produced was ground to a fine powder prior to further processing.

Examples 5–7

Production of the light-scattering molding compounds and articles molded therefrom:

The scattering bodies according to Example 1 in a concentration of 1%, or, respectively, master batch MB1 or master batch MB2 in a concentration of 2%, were/was mixed with the matrix polymer in a wobbling drum mixer. In order to achieve improved adhesion of the pulverulent components and at the same time to avoid dust evolution during mixing, the matrix polymer (which polymer was in the form of granulate) was wetted in advance with 0.1% paraffin oil. Plates 1.5 mm thick were produced from these mixtures by injection molding, and the overall transmissivity of the plates was measured. In addition, the visibility of a light source through the plates was evaluated visually. The results are given in Table 1.

TABLE 1

| Formula | Example 5 | Example 6 | Example 7 | Comparative Example |
|---|---|---|---|---|
| Matrix phase | 99% of a mixture of 70% Vestyron ® 214-31 30% Vestyron ® 562 G | 98% Vestyron ® 114 | 98% Vestyron ® 114 | 99.7% of a mixture of 70% Vestyron ® 214-31 30% Vestyron ® 562 G |
| Added component | 1% SK (according to Example 1) | 2% MB1 (according to Example 3) | 2% MB2 (according to Example 4) | 0.3% of TiO liquid (Fibasol ® white) |
| Overall Transmissivity @ 550 nm (%) | 49 | — | — | 39 |
| Visibility of Light source | not visible | not visible | not visible | not visible |

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A light-scattering polystyrene molding compound comprising:
   (i) 40–99.9 weight % of a polymeric matrix phase comprising at least 50 parts by weight (pbw) styrene, substituted styrenes or a mixture thereof, and
   (ii) 0.1–60 weight % of scattering bodies comprised of a copolymer which in the uncrosslinked state is compatible with the matrix phase (i) comprising:
   (p1) 20–89.5 pbw methyl methacrylate, ethyl methacrylate or a mixture thereof;
   (p2) 10–80 pbw of at least one monomer of formula (I)

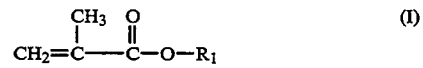

where $R_1$ represents a $C_{3-24}$ alkyl group; and
   (p3) 0.5–10 pbw of at least one crosslinking monomer with two or more ethylenically unsaturated, radically polymerizable groups; and
   (p4) 0–10 pbw of additional ethylenically unsaturated monomers which are radically copolymerizable with (p1), (p2), and (p3); wherein the sum of the amounts of the monomers (p1), (p2), (p3), and (p4) is 100 pbw.

2. The light-scattering polystyrene molding compound according to claim 1, wherein said polymeric matrix phase comprises up to 30 weight % of an optionally crosslinked polymeric impact resistant phase, wherein said impact resistant phase has a glass transition temperature < 10° C.

3. The light-scattering polystyrene molding compound according to claim 1, wherein the index of refraction of said copolymer differs from the index of refraction of the polymeric matrix phase by at least 0.02.

4. The light-scattering polystyrene molding compound according to claim 1, wherein said scattering bodies have a mean particle size of from 0.1 and 150 micron.

5. The light-scattering polystyrene molding compound according to claim 4, wherein said scattering bodies have a mean particle size of from 1 and 10 micron.

6. The light-scattering polystyrene molding compound according to claim 1, wherein said copolymer comprises:
- 90–99.5 weight % of a mixture of (i) methyl methacrylate and (ii) isobutyl methacrylate, n-butyl methacrylate or a mixture thereof, in a weight ratio (of (i) to (ii) in the range of from 3:1 to 1:3; and
- 0.5–10 weight % of a crosslinking monomer.

7. The light-scattering polystyrene molding compound according to claim 1, wherein said molding compound contains 0.2–5.0 wt% of said scattering bodies.

8. The light-scattering polystyrene molding compound according to claim 1, wherein said molding compound contains 5.1–60 wt% of said scattering bodies.

9. The light-scattering polystyrene molding compound according to claim 1, wherein said compound further comprises 0.01–10 weight % of a UV-absorber.

10. A molded article comprising a light-scattering polystyrene molding compound comprising
(i) 40–99.9 weight % of a polymeric matrix phase comprising at least 50 parts by weight (pbw) styrene, a substituted styrene or a mixture thereof, and
(ii) 0.1–60 weight % of scattering bodies comprised of a copolymer comprising:
- p1) 20–89.5 pbw methyl methacrylate, ethyl methacrylate or a mixture thereof;
- p2) 10–80 pbw of at least one monomer of formula (I)

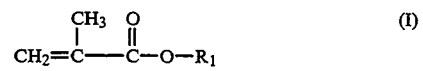

where $R_1$ represents a $C_{3-24}$ alkyl group; and
- p3) 0.5–10 pbw of at least one crosslinking monomer with two or more ethylenically unsaturated, radically polymerizable groups; and
- p4) 0–10 pbw of additional ethylenically unsaturated monomers which are radically copolymerizable with (p1), (p2), and (p3); wherein the sum of the amounts of the monomers (p1), (p2), (p3), and (p4) is 100 pbw.

11. The molded article according to claim 10, wherein said polymeric matrix phase comprises up to 30 weight % of an optionally crosslinked polymeric impact modifier, wherein said impact modifier has a glass transition temperature <10° C.

12. The molded article according to claim 10, wherein the index of refraction of said copolymer differs from the index of refraction of the polymeric matrix phase by at least 0.02.

13. The molded article according to claim 10, wherein said scattering bodies have a mean particle size of from 0.1 and 150 micron.

14. The molded article according to claim 13, wherein said scattering bodies have a mean particle size of from 1 and 10 micron.

15. The molded article according to claim 10, wherein said copolymer comprises:
- 90–99.5 weight % of a mixture of (i) methyl methacrylate and (ii) isobutyl methacrylate, n-butyl methacrylate or a mixture thereof, in a weight ratio of (i) to (ii) in the range of from 3:1 to 1:3; and
- 0.5–10 weight % of a crosslinking monomer.

16. The molded article according to claim 10, wherein said molding compound contains 0.2–5.0 wt % of said scattering bodies.

17. The molded article according to claim 10, wherein said molding compound contains 5.1–60 wt % of said scattering bodies.

18. The molded article according to claim 10, wherein said compound further comprises 0.01–10 weight % of a UV-absorber.

* * * * *